US012129742B2

(12) United States Patent
Heukelman et al.

(10) Patent No.: US 12,129,742 B2
(45) Date of Patent: Oct. 29, 2024

(54) SYSTEM AND METHOD FOR SECURING A FLOW CONTROL DEVICE AGAINST A PIPE

(71) Applicant: Variperm Energy Services Inc., Calgary (CA)

(72) Inventors: Herman Heukelman, Edmonton (CA); Nolan Porttin, Beaumont (CA)

(73) Assignee: Variperm Energy Services Inc., Calgary (CA)

( * ) Notice: Subject to any disclaimer, the term of this patent is extended or adjusted under 35 U.S.C. 154(b) by 451 days.

(21) Appl. No.: 17/303,323

(22) Filed: May 26, 2021

(65) Prior Publication Data

US 2021/0372236 A1 Dec. 2, 2021

Related U.S. Application Data

(60) Provisional application No. 62/704,738, filed on May 26, 2020.

(51) Int. Cl.
*F16L 55/07* (2006.01)
*E21B 41/00* (2006.01)
*F16B 2/08* (2006.01)

(52) U.S. Cl.
CPC .......... *E21B 41/0078* (2013.01); *F16L 55/07* (2013.01); *F16B 2/08* (2013.01)

(58) Field of Classification Search
CPC .................................................. E21B 41/0078
See application file for complete search history.

(56) References Cited

U.S. PATENT DOCUMENTS

| | | | | |
|---|---|---|---|---|
| 395,034 A | * | 12/1888 | Coffin | E21B 10/58 175/401 |
| 1,036,015 A | * | 8/1912 | Shepherd | F16L 37/48 285/8 |
| 1,400,765 A | * | 12/1921 | Pallette | E21B 41/0078 166/57 |
| 2,634,101 A | * | 4/1953 | Sloan | E21B 41/0078 175/324 |
| 7,537,056 B2 | | 5/2009 | MacDougall | |
| 8,376,038 B2 | * | 2/2013 | Hammer | E21B 41/0078 166/51 |
| 8,474,535 B2 | | 7/2013 | Richards et al. | |
| 2003/0107220 A1 | * | 6/2003 | Wagner | F16L 21/065 285/420 |
| 2005/0028329 A1 | * | 2/2005 | Castellanos | F16L 33/08 24/274 R |
| 2008/0041588 A1 | | 2/2008 | Richards et al. | |
| 2009/0120647 A1 | * | 5/2009 | Turick | E21B 34/08 166/205 |
| 2010/0018697 A1 | * | 1/2010 | Richards | E03B 3/18 166/227 |
| 2011/0266374 A1 | * | 11/2011 | Hammer | E21B 17/1085 239/589 |
| 2014/0305630 A1 | * | 10/2014 | Kang | E21B 43/12 166/205 |

(Continued)

*Primary Examiner* — Zachary T Dragicevich
*Assistant Examiner* — James A Linford
(74) *Attorney, Agent, or Firm* — CPST Intellectual Property Inc.; Santosh K. Chari

(57) ABSTRACT

A system for securing at least one flow control device, FCDs, to a pipe used for producing hydrocarbons from a subterranean reservoir comprises a strap provided over the pipe and over the at least one flow control device.

13 Claims, 7 Drawing Sheets

(56) References Cited

U.S. PATENT DOCUMENTS

| | | | |
|---|---|---|---|
| 2015/0021019 A1* | 1/2015 | Veit | E21B 43/08 |
| | | | 166/250.15 |
| 2016/0290110 A1* | 10/2016 | Novelen | E21B 43/084 |
| 2017/0044868 A1 | 2/2017 | van Petegem et al. | |
| 2018/0274330 A1 | 9/2018 | Sim et al. | |

* cited by examiner

SYSTEM AND METHOD FOR SECURING A FLOW CONTROL DEVICE AGAINST A PIPE

CROSS-REFERENCE TO PRIOR APPLICATION

The present application claims priority to U.S. Application No. 62/704,738, filed May 26, 2020, the entire content of which is incorporated herein by reference.

FIELD OF THE DESCRIPTION

The present description relates generally to nozzles, or flow control devices, used for controlling flow of fluids into or out of a tubular member. In one aspect, the nozzles are adapted for use on tubular members used for producing hydrocarbons from subterranean reservoirs. In particular, the following description generally relates to a system and method for securing flow control devices against a base pipe.

BACKGROUND

Subterranean hydrocarbon reservoirs are generally accessed by one or more wells that are drilled into the reservoir to access hydrocarbon materials, in particular oil. The oil is then pumped to the surface through production tubing provided in the wells. The wells drilled into the reservoirs may be vertical or horizontal or at any angle there-between.

In conventional onshore or offshore oil production methods, one or more wells are drilled into the hydrocarbon containing reservoir and the hydrocarbon materials are brought to surface, or "produced", via the production tubing. Such tubing is placed in the wells, or wellbores, to serve as a conduit for the hydrocarbons. Typically, production tubing comprises a number of segments, or tubulars, that are joined together. The tubing generally includes a number of apertures, or perforations or ports, along at least a portion of its length to allow oil from the reservoir to flow into the lumen of the tubing. The segments of tubing having ports may be provided with one or more filtering devices, such as sand screens, which serve to prevent or mitigate against sand and other solid debris in the well from entering the tubing.

One problem that is frequently encountered in oil production is that of water breakthrough, which generally involves the preferential production of water contained in the reservoir instead of oil, thereby resulting in a reduction in the oil production rate. As would be understood, this problem detrimentally affects the economics of the well. Preferential production of water occurs as a result of the lower viscosity of water as compared to oil. This preferential production may occur at one or more locations along the length of the production tubing and results in "water coning". A similar problem is also encountered in reservoirs where gas is present with the oil, where the gas, being more mobile, is preferentially produced over oil, resulting in "gas coning".

To address the above-noted problems, production tubing is usually provided with flow control devices, FCDs, or nozzles, which serve to control the flow of fluids into the tubing and thereby delay or avoid water and/or gas breakthrough. Such inflow control devices, or ICDs, are typically provided in combination with sand screens or other such filtering tools or assemblies and are positioned adjacent the ports on the production tubing. Examples of known ICDs designed for restricting undesired production of water and/or gas are provided in: US 2017/0044868; U.S. Pat. No. 7,537,056; US 2008/0041588; and, U.S. Pat. No. 8,474,535, all of which are incorporated herein by reference as if set forth in their entirety.

FCDs are also used in situations where fluids from a pipe are injected into a reservoir. In such cases, steam, solvents, etc. are injected into a reservoir to stimulate the production of hydrocarbons. FCDs are used in these cases for achieving even injection of the desired fluids along the length of the pipe.

Securing FCDs to the tubing, or base pipe, often involves welding the device, which is a time intensive process that may also lead to damage to the device or base pipe. Other FCD securing techniques involve fasteners or threaded connections etc., which are also time intensive and add to expense.

There is a need for a system or method for securing FCDs in place on the surface of a base pipe.

SUMMARY OF THE DESCRIPTION

In one aspect, there is provided a method of securing a flow control device to a base pipe, wherein the method comprises positioning at least one flow control device on the base pipe and securing the at least one flow control device with a strap. The strap extends circumferentially over the base pipe and over the at least one flow control device.

In another aspect, there is provided a system for securing at least one flow control device on a base pipe, the base pipe including at least one port extending through the wall of the pipe, the at least one flow control device having a first opening for receiving fluids from a subterranean well or for delivering fluids into the reservoir, and a second opening in fluid communication with a respective port for diverting the fluids into or out of the pipe, the system comprising at least one strap adapted to secure at least one of the flow control devices to the base pipe.

BRIEF DESCRIPTION OF THE FIGURES

The features of certain embodiments will become more apparent in the following detailed description in which reference is made to the appended figures wherein.

DETAILED DESCRIPTION

The term "flow control device", "FCD", as used herein generally refers to a device that controls flow of fluids there-through. As known, FCDs are positioned on the outer surface of a base pipe, or tubing segment, adjacent to or otherwise in fluid communication with a port or other such opening on the pipe through which fluid is to flow. FCDs may be used in a production mode, where fluids from a reservoir flow into the base pipe, or in an injection mode, where fluids from the base pipe are introduced into a reservoir. In both cases, the fluid flow occurs through the ports provided along the length of the pipe. For convenience, the present description will refer to the use of the pipe and FCDs when used for producing fluids from a reservoir. In will, however, be understood that the present description is not limited to the manner in which the pipe and FCD are used.

The terms "comprise", "comprises", "comprised" or "comprising" may be used in the present description. As used herein (including the specification and/or the claims), these terms are to be interpreted as specifying the presence of the stated features, integers, steps or components, but not as precluding the presence of one or more other feature, integer, step, component or a group thereof as would be apparent to persons having ordinary skill in the relevant art. Thus, the term "comprising" as used in this specification means "consisting at least in part of". When interpreting statements in this specification that include the term "comprising", the features, prefaced by that term in each statement, all need to be present but other features can also be present. Related terms such as "comprise" and "comprised" are to be interpreted in the same manner.

The term "and/or" can mean "and" or "or".

One or more of the terms "vertical", "vertically", "horizontal", "horizontally", "top", "bottom", "upwardly", "downwardly", "upper", "lower", "inner" and "outer" are used throughout this specification. It will be understood that these terms are not intended to be limiting. These terms are used for convenience and to aid in describing the features herein, for instance, as illustrated in the accompanying drawings.

Figure 1:
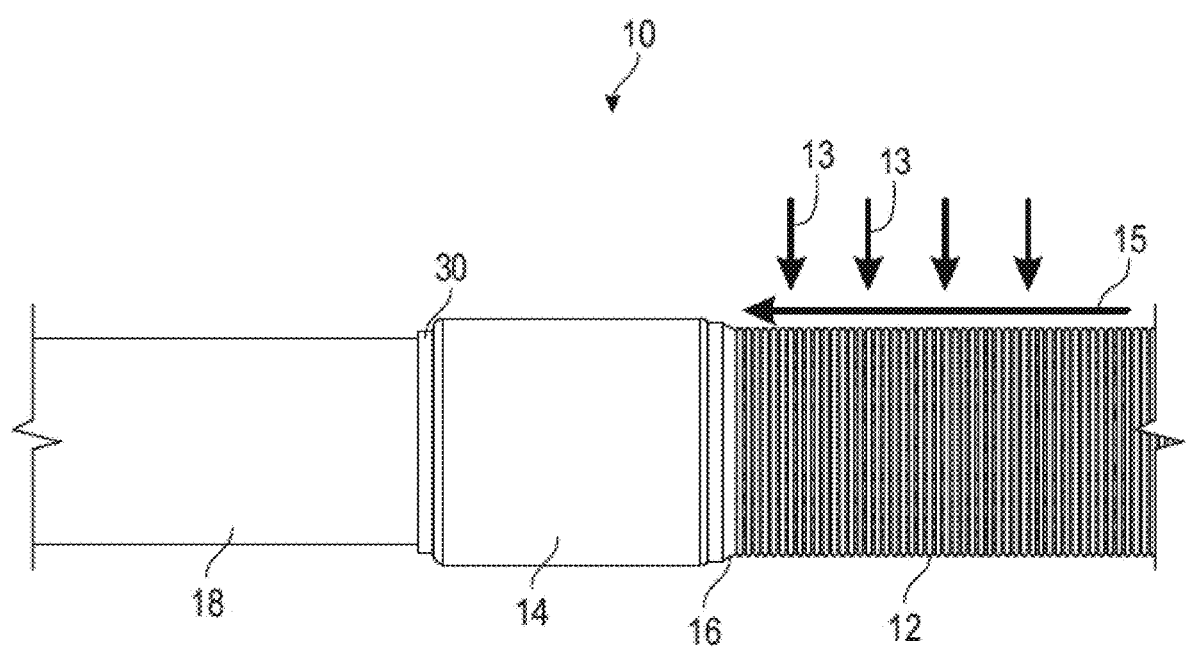
FIG. 1 is a side view of pipe segment incorporating a flow control device.

FIG. 1 illustrates a base pipe segment 10 comprising a base pipe 18, a sleeve 14, and, in the example shown, a sand control screen, or "sand screen", 12. The base pipe 18 shown is a section of a tubular member that, when combined with other tubulars, forms a production or tubing string that is provided within a subterranean well. As known in the art, the sand screen 12 is wrapped around the base pipe 18 in a radially spaced apart manner, thereby forming an annular space between the screen and the surface of the pipe 18. The sleeve 14 may be sealed to the sand screen 12 by a first seal 16, as would be known in the art. Opposite the sand screen 12, the sleeve 14 is sealed to the pipe 18 by means of a second seal 30. In use, fluid from a reservoir flows through the sand screen as shown by the arrows 13, and is then flowed towards the sleeve 14 as shown by arrow 15. As known in the art, the sleeve 14 has an internal diameter that is larger than the outer diameter of the base pipe. Thus, the sleeve 14 is provided in a radially spaced apart arrangement with the base pipe 18 to form a second annular space for receiving fluids flowing from the sand screen 12.

Figure 2:
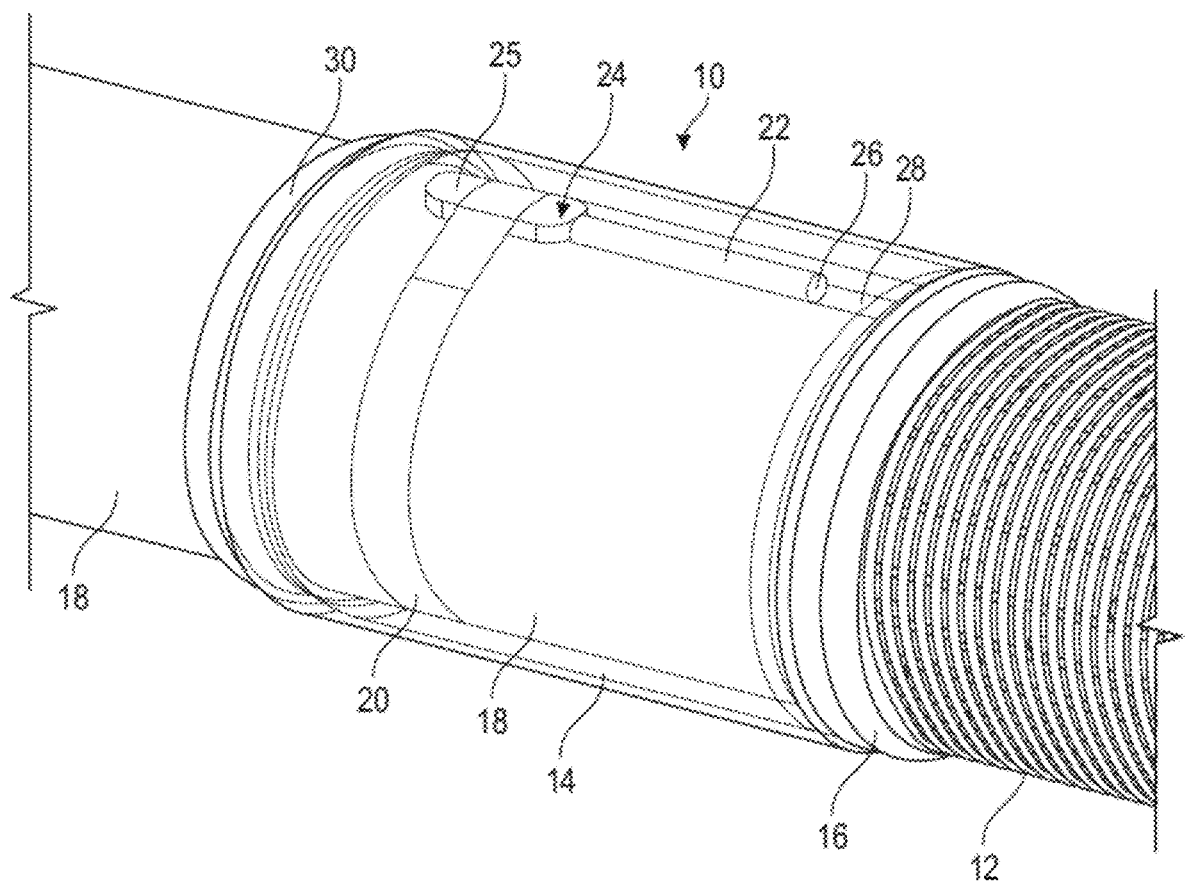
FIG. 2 is a perspective view of the pipe segment of FIG. 1, with a portion shown with transparency to illustrate the flow control device.

In FIG. 2, the sleeve 14 is shown in a transparent manner to facilitate illustration of the components underneath such sleeve. As shown, beneath the sleeve 14, and within the second annular space, the base pipe 18 is provided with a flow control device, or FCD, 24. As would be known to persons skilled in the art, the FCD is provided adjacent to or, as in the illustrated case, over a port provided on the base pipe 18. Such port is illustrated, for example, in FIG. 4. In the example shown, the FCD comprises a primary flow component 22, which receives, through an FCD inlet 26, fluid flowing through the sand screen 12. As noted above, this flow path will be used when producing fluids from a reservoir and the present description is not intended to be limited to such operating mode. The primary flow component 22 may further comprise an internal flow path having a predetermined geometry for modifying the flow of fluid there-through. In such case, the primary flow component may also be referred to as the nozzle component.

The FCD 24 may further comprise a secondary flow, or diverter component 25, which diverts the flowing fluid through an FCD outlet and into the port on the base pipe 18. As mentioned above, this flow path would occur when in production mode.

In one aspect, the base pipe 18 may be provided with recess, such as shown at 28, on its outer surface for receiving and locating the FCD. The recess 28 may comprise any shape that is complementary to the shape of the FCD. In one aspect, the recess 28 comprises a shape that accommodates the primary flow component 22 as well as we the diverter component 25.

Although reference is made above to the presence of a sand screen, it will be understood that the use of such screen is optional and would depend on the characteristics of a given well. Thus, in some instances, the arrangement discussed herein may not incorporate a sand screen.

As discussed above, FCDs are often retained in position on a pipe by means of welding etc. In as aspect of the present description as shown in FIG. 2, such welding is avoided by the use of a retaining band or strap 20, which serves to retain the FCD in position over the base pipe 18. This component is discussed further below.

Figure 3:
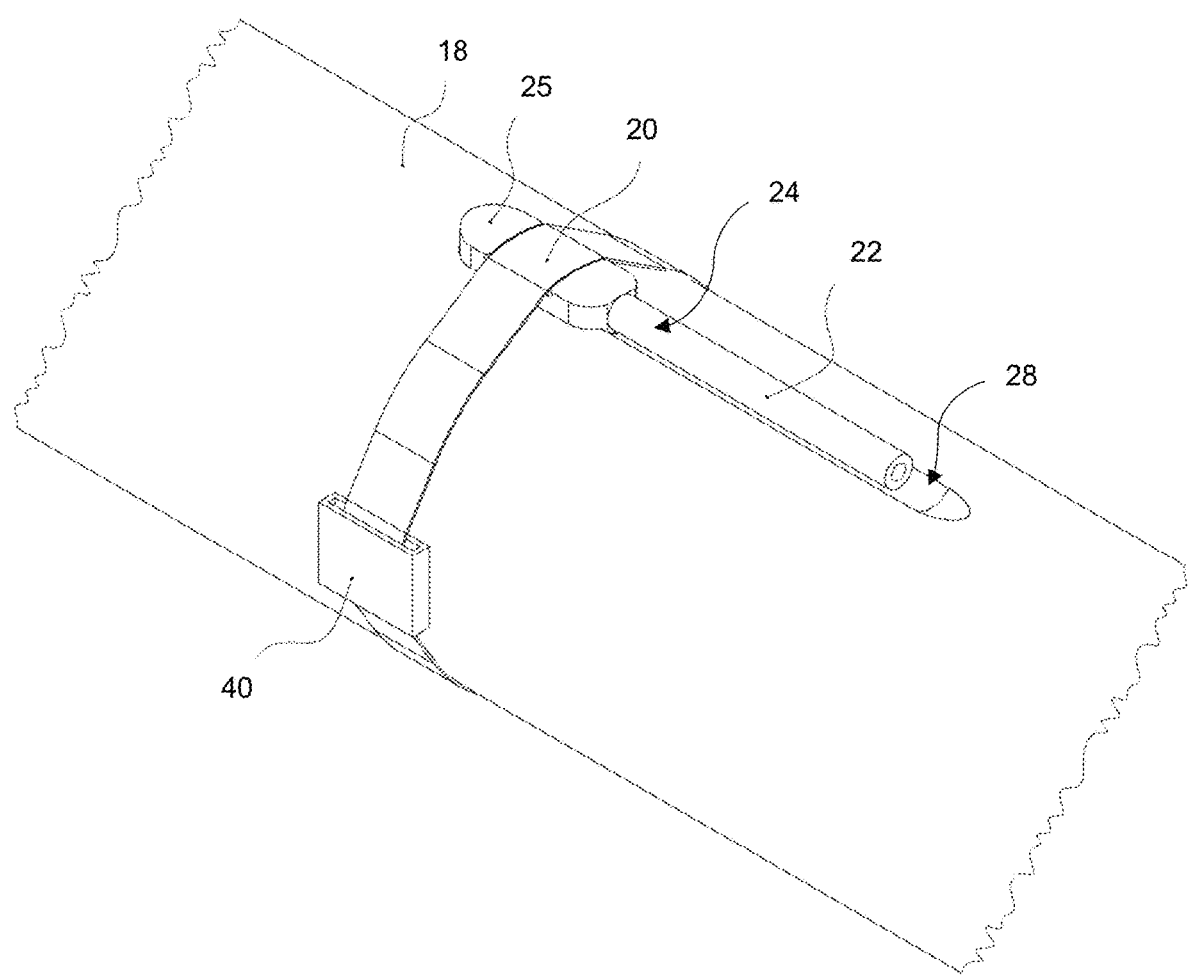
FIG. 3 is another perspective view of the pipe segment of FIG. 1, illustrating the flow control device.

FIG. 3 illustrates only the base pipe 18 and the FCD 24 for facilitating the description. As shown, the FCD 24 is secured to the pipe 18 by means of the strap 20. As discussed above, prior means of securing FCDs involved welding the FCD to the base pipe or by otherwise fastening the FCD to the pipe or other component. In contrast to such known devices and methods, the strap 20 described herein provides a unique and efficient means of achieving the same result. As would be understood, the use of such a strap would generally be counterintuitive in view of the harsh conditions typically encountered in hydrocarbon production operations. As also illustrated, and as discussed further below, the strap 20 is, in one aspect, preferably provided over the diverter component 25 of the FCD 24. As will be understood, the diverter component 25 may be provided over or in fluid communication with a port on the base pipe.

Figure 4:
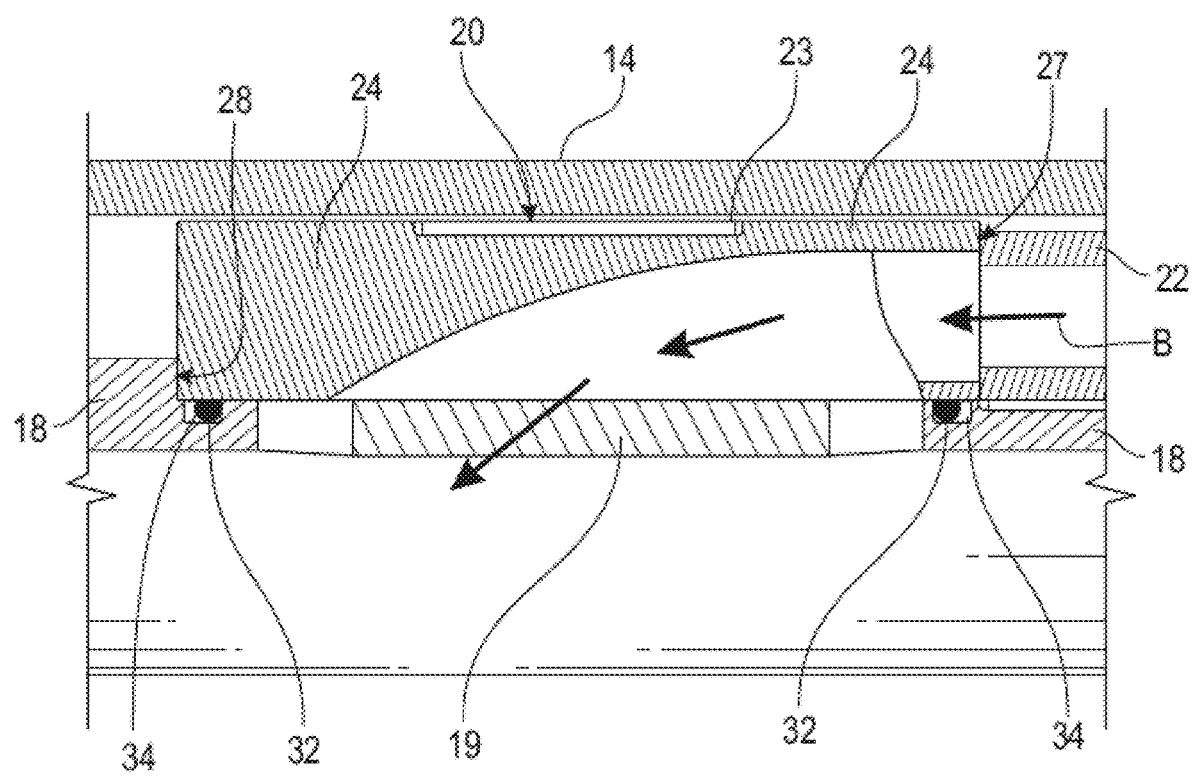
FIG. 4 is a side cross-sectional view of the pipe segment of FIG. 1, showing a port on the base pipe and the flow control device.

FIG. 4 illustrates an enlarged section of the apparatus discussed above. As shown, the base pipe 18 is provided with a port 19, through which fluid is communicated from the FCD 24 to the lumen of the pipe 18. As shown in FIG. 4, fluid that enters the FCD from the sand screen (as discussed above) passes through the primary component 22 of the FCD 24. The fluid then exits the primary component 22 and passes into the diverter component 25, as shown by the arrow B. In one aspect, the primary component 22 and diverter component 25 of the FCD may comprise separate sections that can be joined together by means of brazing, welding etc. In the illustrated example, the two components are connected by brazing as shown at 27. In another aspect, the FCD 24 may comprise a unitary body or may include other components for diverting or conditioning the fluid flow. Generally, fluid that enters the diverter component 25 is diverted from its previous, generally longitudinal or axial flow path (in relation to the pipe 18) towards the port 19. For this purpose, the diverter is provided with a suitable conduit for providing such diversion of flow. In one aspect, the conduit may have an arcuate shape, such as shown in FIG. 4, for causing diversion of the fluid flow. It will be understood that other geometries for the conduit would be known to persons skilled in the art.

FIG. 4 also illustrates the arrangement of the FCD between the pipe 18 and the sleeve 14. Also illustrated is the strap 20 for retaining the FCD in position over the port 19 of the pipe 18. In one aspect, the FCD 25 may be provided with a groove or recess 23 for receiving and locating the strap 20 thereon. As would be understood, such recess 23 aids in locating the strap and preventing relative axial movement between the strap and the FCD. It will be understood that the recess 23 will have a shape that accommodates the strap 20.

Since the FCD described herein is preferably not welded or permanently attached to the base pipe 18, the present description also contemplates a seal to be provided therebetween to prevent fluid leakage. In this regard, one or more seals shown at 32 may be used for this purpose. The seal 32, which may for example comprise an O ring having a shape adapted to seal about a face of the diverter component 25 that abuts the base pipe 18. In this way, the seal 32 provides a fluid seal between the diverter component 25 of the FCD 24 and the pipe 18. To further facilitate such seal, the seal 32 may be provided or retained within a respective groove 34 provided on the outer surface of the pipe 18, and preferably within the portion of the recess 28 that accommodates the diverter component 25. As will be understood, the groove 34 is sized to receive the seals 32 and to allow sufficient clearance so as to allow a seal to form between the pipe 18 and the diverter component 25. As discussed above, and as shown in FIG. 4, the pipe 18 preferably includes a recess 28 or the like provided on its outer surface to receive and positively position the FCD 24 thereon.

Reverting to FIG. 3, an aspect of the description is illustrated wherein the strap 20 is secured over the pipe 18 and FCD 24 and provided with a buckle 40. The strap 20 may comprise a body having opposed ends that are secured together with the buckle 40. In other aspects the strap 20 may comprise opposed ends that are connected together by any means, such as threaded fasteners, friction clamps, or the like. In other aspects, one or both ends of the strap 20 may also be secured to the surface of the pipe 18, although this may not be preferred as it would involve additional time for installation. In other aspects, the strap 20 may be a continuous loop or band, that is tightened over the pipe and FCD. Another type of buckle or ratchet mechanism etc. may be used for this purpose.

Figure 5:
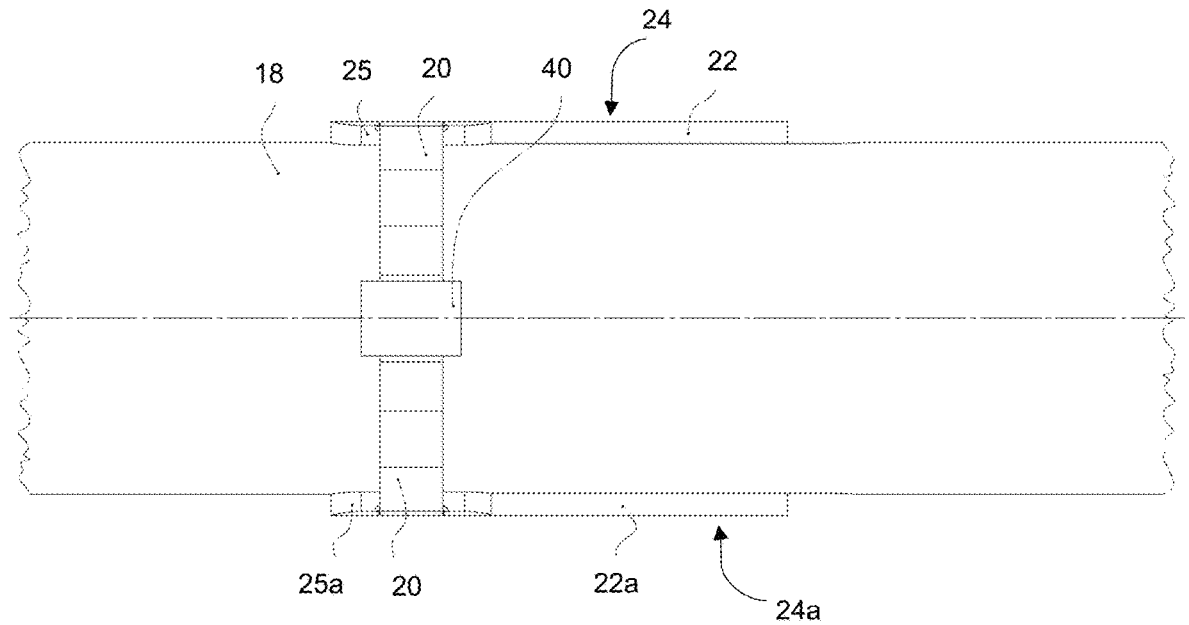
FIG. 5 is a side elevation of a pipe segment comprising more than one flow control device.
Figure 6:
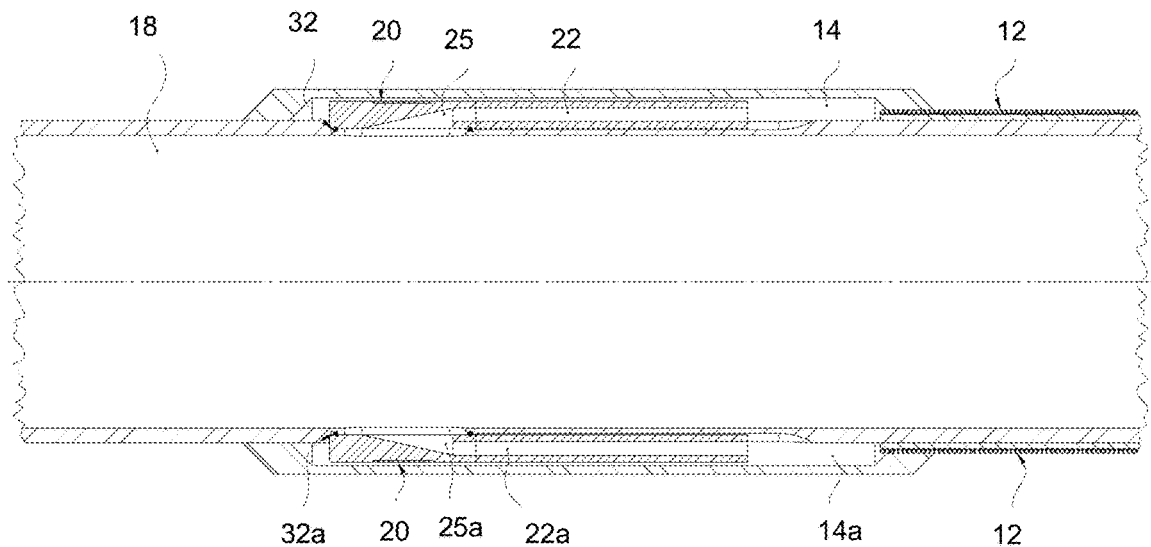
FIG. 6 is a side cross-sectional view of the pipe segment with a flow control device of FIG. 5 with a sleeve there-over in combination with a sand screen.
Figure 7:
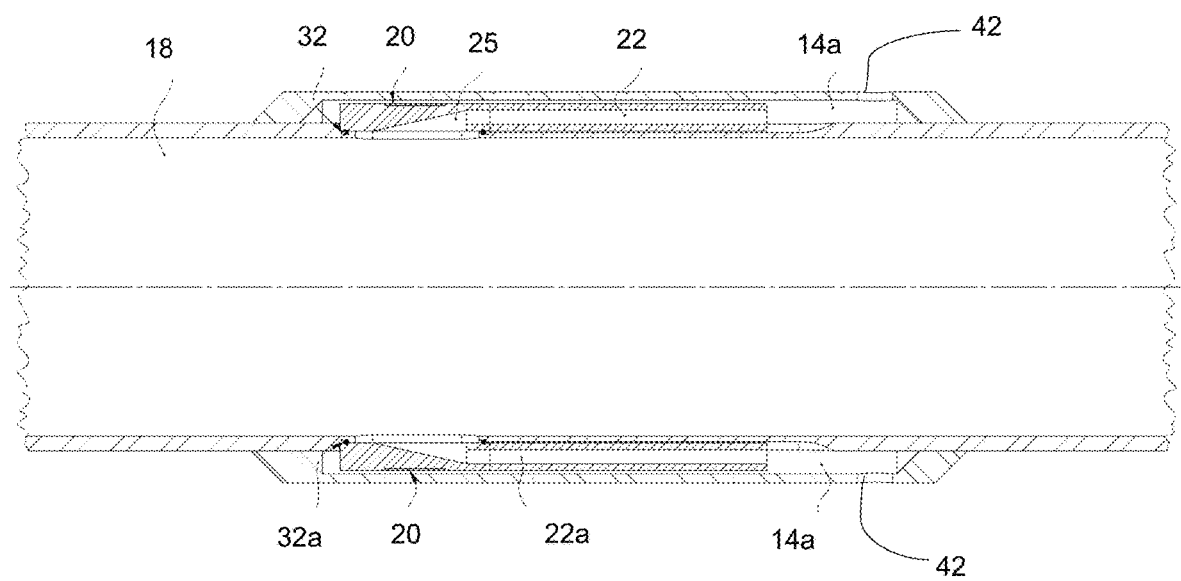
FIG. 7 is a side cross-sectional view of a pipe segment with a flow control device of FIG. 5 with a sleeve there-over.

FIGS. 5 to 7 illustrate other aspects of the description wherein more than one FCD is provided on a base pipe 18. In these figures, elements that are similar to those described above are identified with like reference numerals but with the letter "a" added for clarity. In FIG. 5 It will be understood that the number of FCDs will depend upon the number of ports provided on the pipe 18. In the example shown in FIG. 5, two FCDs, 24 and 24a, are provided and such FCDs may be secured to the base pipe 18 using a common strap 20 particularly when the FCDs 24 and 24a are provided at a common longitudinal position along the pipe, even if circumferentially separated.

The strap 20 may optionally include a buckle 40 as discussed above. FIG. 5 also illustrates an aspect wherein no sleeve 14 is provided. In other words, fluid from a well is directed into the FCD directly, in the manner discussed above.

In a further aspect, it will be understood that more than one strap may be used to secure one or more FCD on a pipe.

FIG. 6 illustrates another aspect showing a base pipe 18 having at least two FCDs as well as a sand screen 12 and sleeve 14, as discussed above.

FIG. 7 illustrates another aspect, wherein the base pipe 18 is provided with a sleeve 14a but without a sand screen. In this case, the sleeve 14a is provided with a number of apertures 42 that are preferably circumferentially spaced around the sleeve 14a. In this instance, fluid from the well would pass first through the apertures 42 and then into to the FCDs and ultimately into the base pipe 18 as discussed above. It will be understood that the sleeve 14a in this aspect would serve to protect the FCDs, particularly during the run-in procedure but also during the production operation.

Figure 8:
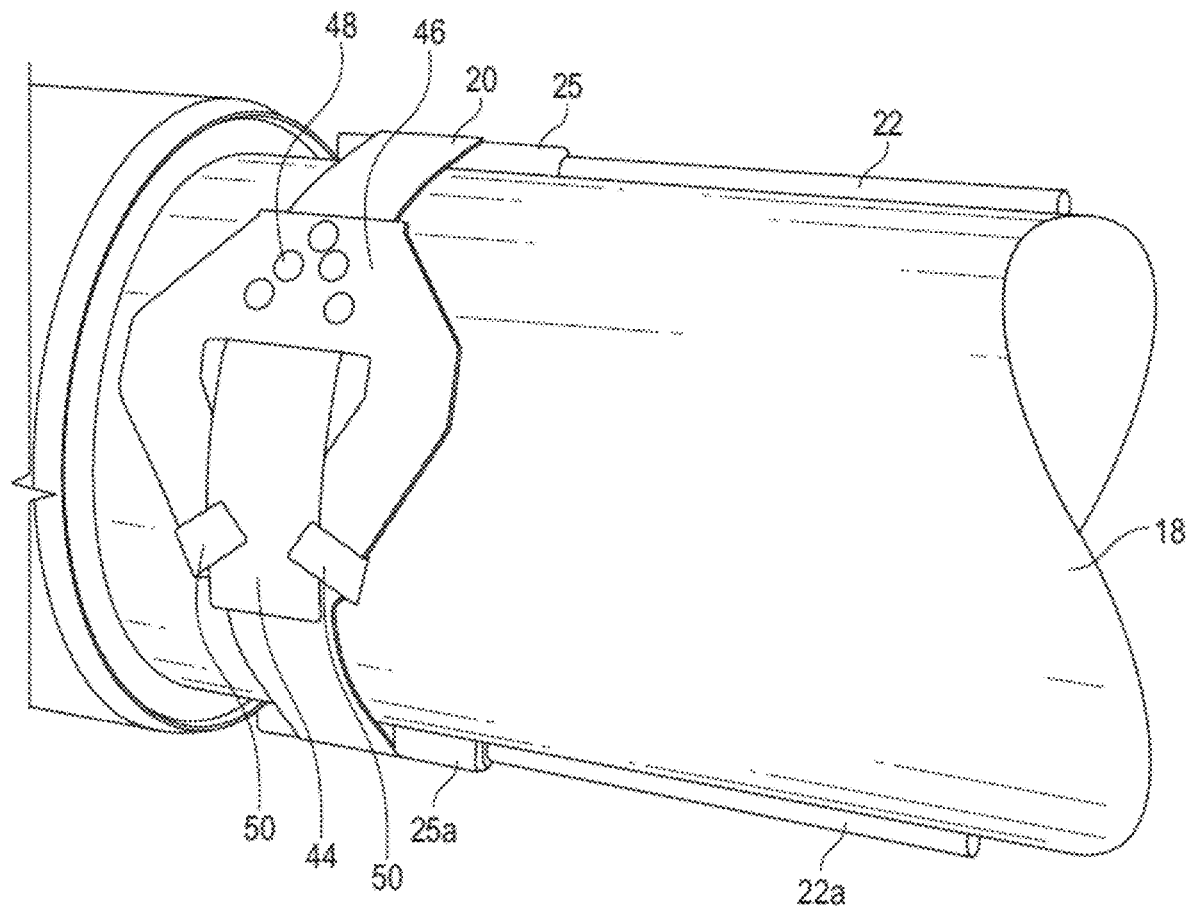
FIG. 8 is a side view of a pipe segment with a strap according to another aspect.

As noted above, the strap 20 described herein may secured in various ways, one of which may involve a buckle or the like. A further aspect of the strap is illustrated in FIG. 8. In this example, the strap 20 comprises a unitary band having a first end 44 and a second end 46. The second end 46 of the strap is provided with a loop, through which the first end 44 is passed during installation on a base pipe 18. Thereafter, welds, such as shown at 48, may be used to secure the ends 44 and 46 together. In one aspect, the second end 46 may also comprise clips 50 for retaining the first end 44. Such clips may be used in cases where the strap 20 is made of a strip of metal or other such non-flexible material.

The strap 20 described herein may be made of any material suitable for the current purpose. It will be understood that the material should be sufficiently malleable so as to be tightened over the pipe and the one or more flow control devices. It will also be understood that the material for the strap should be capable of withstanding the temperature, pressure and chemical (e.g. pH) characteristics typically associated with wellbores, including the ability to withstand mechanical abrasion caused by particulate material in the flowing fluid. Some examples of suitable materials include steel, stainless steel, polymers, fabrics, composites, etc. It will be understood that various other materials may be used for the strap while achieving the desired purpose provided herein.

As noted above, prior to the present description, the use of a strap or the like was not conceivable due to the aforementioned wellbore conditions. The present inventors have thus devised a unique and efficient means of securing flow control devices to pipes used in hydrocarbon production processes. Such processes may include hydrocarbon production, where reservoir fluids are flowed into a pipe, and/or fluid injection processes, where fluids, such as steam or other stimulation fluids, are injected from a pipe into a reservoir. The device and system described herein is not limited to any particular well operation mode.

Although the above description includes reference to certain specific embodiments, various modifications thereof will be apparent to those skilled in the art. Any examples provided herein are included solely for the purpose of illustration and are not intended to be limiting in any way. Any drawings provided herein are solely for the purpose of illustrating various aspects of the description and are not intended to be drawn to scale or to be limiting in any way. The scope of the claims appended hereto should not be limited by the preferred embodiments set forth in the above description but should be given the broadest interpretation consistent with the present specification as a whole. The disclosures of all prior art recited herein are incorporated herein by reference in their entirety.

We claim:

1. A system for securing at least one flow control device to an outer surface of a base pipe, the base pipe including at least one port extending through the wall of the pipe, the system comprising a sleeve provided over a portion of the base pipe comprising the at least one port, the sleeve having an inner diameter greater than the outer diameter of the base pipe to define an annular space between the outer surface of the base pipe and the sleeve, the at least one flow control device being provided directly on the outer surface of the base pipe in the annular space, the flow control device having a generally cylindrical primary component having a first opening for receiving fluids from a subterranean well or for delivering fluids into the reservoir, and a diverter component in fluid communication with the primary component, the diverter component having a second opening in fluid communication with a respective port on the base pipe for diverting the fluids into or out of the pipe, the system comprising at least one strap provided in the annular space and extending circumferentially around and being in contact with the base pipe and over the at least one flow control device to secure at least one of the flow control devices to the outer surface of the base pipe; the diverter component being larger than the primary component in a direction along the circumference of the base pipe; and the strap extending around and contacting a radially outer most portion of the diverter component and a radially outermost portion of the base pipe.

2. The system of claim 1, wherein the base pipe is provided with two or more flow control devices and the strap extends over the two or more flow control devices.

3. The system of claim 1, wherein the outer surface of the base pipe includes respective recesses for locating the at least one flow control device and the strap is adapted to retain the flow control devices in the respective recesses.

4. The system of claim 1, wherein the at least one flow control device is provided with a seal to form a seal with the base pipe.

5. The system of claim 1, wherein the at least one flow control device includes a recess for receiving and locating the strap.

6. The system of claim 1, further comprising a locking or tightening device for securing the at least one strap against the base pipe.

7. The system of claim 6, wherein the locking or tightening device comprises a buckle.

8. The system of claim 1, wherein the strap comprises a band having opposed ends and wherein the opposed ends are connected together once provided over the base pipe and over the at least one flow control device.

9. The system of claim 8, wherein one end of the strap comprises a loop for receiving the opposite end therethrough.

10. The system of claim 9, wherein the opposed ends of the strap are connected by welding.

11. The system of claim 8, wherein the opposed ends of the strap are connected by welding.

12. The system of claim 1, wherein the sleeve includes a plurality of apertures.

13. The system of claim 12, wherein the apertures are circumferentially spaced around the sleeve.

* * * * *